US012696060B2

(12) United States Patent
Casties et al.

(10) Patent No.: US 12,696,060 B2
(45) Date of Patent: Jul. 28, 2026

(54) METHOD FOR ACTIVATING A VEHICLE FUNCTION AND ASSOCIATED ACTIVATING DEVICE

(71) Applicant: Continental Automotive Technologies GmbH, Hannover (DE)

(72) Inventors: Mathieu Casties, Lasserre (FR); Christophe Grisey, Colomiers (FR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 6 days.

(21) Appl. No.: 18/947,079

(22) Filed: Nov. 14, 2024

(65) Prior Publication Data

US 2025/0203330 A1 Jun. 19, 2025

(30) Foreign Application Priority Data

Dec. 19, 2023 (FR) ................................. FR2314452

(51) Int. Cl.
*H04W 4/44* (2018.01)
*B60R 16/023* (2006.01)
*B60R 16/033* (2006.01)

(52) U.S. Cl.
CPC ........... *H04W 4/44* (2018.02); *B60R 16/0231* (2013.01); *B60R 16/033* (2013.01)

(58) Field of Classification Search
CPC ..... H04W 4/44; B60R 16/0231; B60R 16/033
USPC ......................................... 701/2
See application file for complete search history.

(56) References Cited

U.S. PATENT DOCUMENTS

2016/0288770 A1 10/2016 Hermann et al.
2019/0031141 A1* 1/2019 Lazarini .................. B60R 25/24

OTHER PUBLICATIONS

France Search Report with translation mailed Jul. 16, 2024, for corresponding Application No. FR2314452. (22 pages).

* cited by examiner

*Primary Examiner* — Isaac G Smith
(74) *Attorney, Agent, or Firm* — Buchanan Ingersoll & Rooney PC

(57) ABSTRACT

A method for activating a vehicle function, of one vehicle among a plurality of vehicles, by an activating device, the device communicating with a user's portable access equipment. The vehicle function triggered on detection of the presence of the portable equipment in a predetermined zone around the vehicle, in a polling phase, and on authentication of the equipment. The method includes: selecting from the plurality of vehicles, a master vehicle and slave vehicles; each slave vehicle sending the master vehicle a specific identifier; the master vehicle sending each slave vehicle an instruction putting their polling phase on standby; increasing the frequency and/or power of the polling transmissions of the master vehicle and generating an enlarged predetermined zone around the master vehicle. If the presence of an authenticated user is detected in the predetermined zone, the master vehicle sends a wake-up instruction to the slave vehicle corresponding to the identifier triggering its polling phase; activating the vehicle function of the slave vehicle if the authenticated user is located in a predetermined zone around the slave vehicle.

10 Claims, 3 Drawing Sheets

METHOD FOR ACTIVATING A VEHICLE FUNCTION AND ASSOCIATED ACTIVATING DEVICE

CROSS REFERENCE TO RELATED APPLICATION

This application claims priority to French Patent Application No. 2314452, filed Dec. 19, 2023, the contents of such application being incorporated by reference herein.

FIELD OF THE INVENTION

The invention relates to a method for activating a vehicle function such as a function for unlocking/locking hatches of the vehicle, but also a function for preheating the seats of the vehicle, or a function for preselecting radio stations, etc. when the presence of the user is detected near their vehicle, and to an associated activating device. The invention more particularly applies to a vehicle located in a parking lot surrounded by other motor vehicles.

BACKGROUND

In a motor vehicle, it is known practice to use vehicle-function-activating devices that are able to detect the presence of a hand or foot of a user of the vehicle and thus allow all or some of the hatches of the vehicle, for example the doors or trunk, to be locked or unlocked. By way of example, detection of the presence of a hand of a user on or in front of a door handle in conjunction with recognition of an identifier of a "hands-free" access equipment borne by the user allows these hatches to be locked and unlocked.

A so-called "hands-free" system for accessing a motor vehicle allows an authorized user to lock and/or unlock the hatches of their vehicle without having to physically press buttons on a key. For this purpose, the vehicle identifies a portable equipment such as a keycard or a remote control or even a key borne by the user and, if the keycard or the remote control or indeed the key is located in a predetermined zone around the vehicle or in the vehicle and is identified as belonging to the vehicle, then the vehicle automatically locks/unlocks its hatches depending on the intention of the user, without the user having to physically manipulate a key.

To do this, when the user approaches the vehicle, a communication is set up over a wireless communication link between the "hands-free" access equipment, for example an electronic keycard or a smartphone, and the vehicle-function-activating device in order to authenticate said access equipment by virtue of its identifier.

To this end, the activating device comprises at least one radio-frequency antenna allowing the identifier sent by the "hands-free" access equipment to be received. The activating device is connected to an electronic computer or ECU of the vehicle (ECU being the abbreviation of electronic control unit), to which it transmits the identifier.

In the prior art, the access equipment is generally an electronic keycard. The signal received by the antenna of the activating device, containing the identifier of the access equipment, is sent via RF or LF waves (RF standing for radio-frequency and LF standing for low-frequency). The exact location of the portable equipment around the vehicle is determined via measurements of the strength of the LF signal received by the portable equipment (via the antennas and the electronic control unit) from the vehicle, which strength measurements are more commonly called RSSI measurements (RSSI standing for received signal strength indicator). The measurement of the power of each signal received by the portable equipment from each antenna of the plurality of LF antennas located in the vehicle V is received and analyzed by an activating device embedded in the vehicle, which thus determines, via triangulation, the position of the portable equipment with respect to said LF antennas, i.e., with respect to the vehicle.

Depending on the location of the portable equipment identified by the vehicle, in said location zones, certain actions specific to said location zones are automatically carried out: unlocking/locking or turning on welcome lighting of the passenger compartment.

Nowadays, however, it is increasingly common to use a cell phone to perform authentication functions, this avoiding the need to use a dedicated electronic keycard and thus limiting the required number of pieces of equipment. Most cell phones do not possess RF or LF communication means. Therefore, "hands-free" start-up and/or access systems have needed to be adapted to vehicles in order for said systems to be able to also interact with a cell phone equipped with other communication standards, such as ultra-wideband (UWB) or Bluetooth Low Energy® (BLE) or Wi-Fi (Wireless Fidelity) for example, and no longer solely via radio- and low-frequency (RF and LF) waves. In particular, ultra-wideband (UWB) is a radio modulation technique based on transmission of pulses of very short duration, often less than one nanosecond. Thus very high values of bandwidth may be achieved.

Approach of the access equipment into the vicinity of (less than 2 m away from) the activating device and recognition of the received identifier by the computer, in conjunction with detection of the presence of the hand of the user, allows the door to be locked or unlocked.

The drawback of such a method, regardless of the means of communication used, whether it is low-frequency, high-frequency or ultra-high-frequency, lies in the need for the vehicle to transmit recurrent radio-frequency signals in order to detect the approach of the user. These successive transmissions consume energy, which is provided by the battery of the vehicle. The risk is that, if the vehicle is parked for weeks, its battery will drain and the vehicle will no longer start.

There are standby strategies that allow the vehicle to reduce the frequency of these transmissions when it is detected that the vehicle has not moved for some time. However, the drawback here lies in how long it takes the vehicle to wake up and to react in time and rapidly to an unlock request from a user.

An aspect of the invention provides a method for activating a vehicle function and an associated activating device that overcome the drawbacks of the prior art, in particular when the vehicle is parked in a parking lot surrounded by other motor vehicles.

SUMMARY OF THE INVENTION

An aspect of the invention provides a method for activating a vehicle function, of one vehicle among a plurality of vehicles, by way of an activating device intended to be embedded in the motor vehicle, the device comprising radio-frequency communication means capable of communicating with a portable access equipment borne by a user, the vehicle function being triggered on detection of the presence of said portable user equipment in a predetermined zone around the vehicle, in a polling phase, and on authentication of said equipment, the method being noteworthy in that the plurality of vehicles are equipped beforehand with radio-frequency vehicle-to-vehicle communication means, and in that the activating method comprises the following steps:

a. from the plurality of vehicles, selecting a master vehicle, depending on predefined criteria, and slave vehicles, b. getting each slave vehicle to send the master vehicle a specific identifier, c. getting the master vehicle to send each slave vehicle an instruction to put their polling phase on standby, d. putting the polling phase of the slave vehicles on standby, e. increasing the frequency and/or power of the polling transmissions of the master vehicle and generating an enlarged predetermined zone around the master vehicle, f. if the presence of a user authenticated by an identifier is detected in said enlarged predetermined zone around the master vehicle, then g. sending a wake-up instruction from the master vehicle to the slave vehicle corresponding to the identifier, h. waking up said slave vehicle and getting said slave vehicle to trigger its polling phase, i. activating the vehicle function of the slave vehicle if the authenticated user is located in a predetermined zone around the slave vehicle.

Judiciously, the method is repeated for each new vehicle entering the enlarged transmission zone of the master vehicle or leaving said transmission zone.

A master vehicle is selected through:

a. vehicle-to-vehicle communication, b. exchange between the vehicles of values of predefined criteria, c. comparison of the values of the predefined criteria with one another.

More precisely, the predefined criteria comprise at least:

a. a threshold value or a maximum value of the state of charge of a battery of the vehicle, b. a maximum transmission range.

An aspect of the invention also relates to a device for activating a vehicle function, said device being intended to be embedded in a vehicle, the device comprising radio-frequency communication means capable of communicating with a portable access equipment borne by a user, the vehicle function being triggered on detection of the presence of said portable user equipment in a predetermined zone around the vehicle, in a polling phase, and on authentication of said equipment, the device being noteworthy in that it is capable of:

a. communicating with other vehicles among a plurality of vehicles, b. selecting, from the plurality, a master vehicle and slave vehicles depending on predefined criteria, c. receiving from each slave vehicle a specific identifier, d. sending to each slave vehicle an instruction to put its polling phase on standby, e. increasing a frequency or transmit power of the polling phase, f. detecting the presence of a user authenticated by an identifier in an enlarged predetermined zone, g. sending an instruction to wake up its polling phase to a slave vehicle corresponding to the identifier of the authenticated user.

The device is further capable of exchanging, with the other vehicles, values of predefined criteria, and of comparing the values with one another.

More precisely, the predefined criteria comprise:

a. a threshold value or a maximum value of the state of charge of a battery of the vehicle, b. a maximum transmission range of the vehicle.

An aspect of the invention also relates to any computer program product comprising program code instructions for executing the steps of the method according to any one of the features listed above, when said program is executed on a computer.

Finally, an aspect of the invention applies to any motor vehicle comprising an activating device according to any one of the features listed above.

BRIEF DESCRIPTION OF THE DRAWINGS

Other features and advantages of aspects of the invention will become more clearly apparent on reading the following description. This description is purely illustrative and should be read with reference to the attached drawings, in which.

DESCRIPTION OF THE EMBODIMENTS

Figure 1:
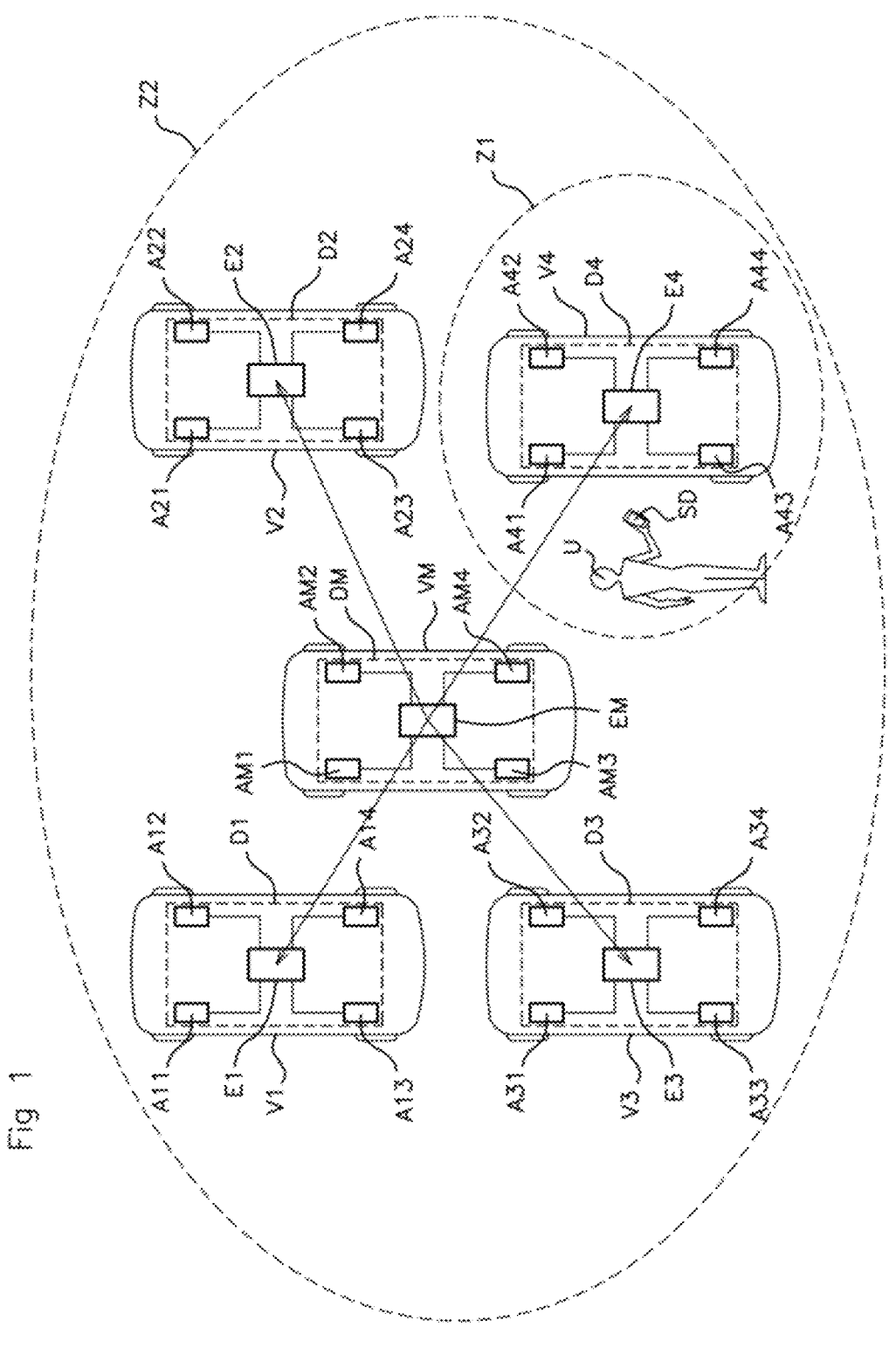
FIG. 1 schematically shows a plurality of vehicles comprising a master vehicle and slave vehicles, FIG. 2 schematically shows an activating device according to an aspect of the invention.

FIG. 1 shows a plurality of vehicles V1, V2, V3, V4, VM each comprising a device D1, D2, D3, D4, DM for activating a vehicle function.

According to an aspect of the invention, each vehicle of the plurality shown in FIG. 1 is equipped with a device D1, D2, D3, D4, DM for activating a vehicle function, for example a device for activating "hands-free" locking/unlocking of the vehicle.

To this end, each vehicle comprises low-, high- or ultra-high radio-frequency transmit antennas, such as RF, BLE (Bluetooth) or UWB (ultra-wideband) antennas. For example, each vehicle is equipped with four radio-frequency antennas A11 . . . A14, A21 . . . A24, A31 . . . A34, A41 . . . A44, AM1 . . . AM4, each antenna being connected to an electronic control unit E1, E2, E3, E4, EM of the corresponding vehicle.

Each of these vehicles V1, V2, V3, V4, VM is thus capable of detecting the presence of a user U equipped with a portable equipment SD in a predetermined zone Z1 around said vehicle in a phase called the polling phase, i.e. a phase of transmission of radio-frequency waves, then of activating the vehicle function if the user is authenticated, i.e. if the identifier ID of the equipment SD exchanged with the vehicle corresponds to an identifier registered beforehand and identified as being authorized to activate the vehicle function.

This method for activating a hands-free function and the corresponding activating device are known to those skilled in the art and will not be described in more detail here.

According to an aspect of the invention, the plurality of vehicles V1, V2, V3, V4, VM comprises vehicles called "slave vehicles" V1, V2, V3, V4 and at least one vehicle called the "master vehicle" VM, as will be described below.

In order to categorize vehicles into "masters" and "slaves", said vehicles are capable of vehicle-to-vehicle communication.

Also according to an aspect of the invention, the vehicle called the "master vehicle" VM is capable of asking the slave vehicles V1, V2, V3, V4 to enter a standby phase, during which the polling phase of said vehicles is stopped momentarily, and is also capable of waking up said slave vehicles or at least one slave vehicle so that the polling phase of said vehicles or of the one vehicle in particular is again operational.

During the standby phase of the slave vehicles V1, V2, V3, V4, the master vehicle VM for its part implements an optimized polling phase, i.e. a phase of polling either with an increased transmission frequency or with an increased transmission power, in order to enlarge the predetermined radio-frequency transmission zone Z2 around it.

The master vehicle VM is chosen depending on predetermined criteria, and each vehicle may either play the role of slave vehicle or the role of master vehicle.

The activating method will be described below.

According to an aspect of the invention, each activating device D1, D2, D3, D4, DM is therefore able to perform either the functions of the slave vehicle V1, V2, V3, V4 or those of the master vehicle VM.

To this end, each activating device D1, D2, D3, D4, DM comprises:

a. means M1 for communicating with other vehicles located in the transmission zone of said device, b. means M2 for selecting a master vehicle and slave vehicles depending on predefined criteria, c. means M3 for receiving specific identifiers ID of the slave vehicles, d. means M4 for sending an instruction to put their polling phase on standby to the slave vehicles, e. means M5 for increasing the power or frequency of the transmissions of the polling phase of the vehicle in which it is located, f. means M6 for detecting the presence of a user U and for authenticating said user by way of an identifier ID in an enlarged predetermined zone Z2, g. means M7 for sending an instruction to wake up its polling phase to the slave vehicle corresponding to the identifier ID.

The vehicle-to-vehicle communication means M1 comprise antennas and means for sending/receiving between each vehicle. As vehicle-to-vehicle communication is known in the prior art it will not be described in more detail here.

The means M2 for selecting a master vehicle VM and slave vehicles V1, V2, V3, V4 are capable of receiving values of predefined criteria from each vehicle, of comparing them together and of selecting, depending on the results of the comparisons, a master vehicle VM from the plurality of vehicles. The selection criteria may be: the state of battery charge with respect to a threshold value, or a maximum value of the state of charge, and/or a maximum transmission range and/or even the centrality of the location of the master vehicle with respect to the slave vehicles, this allowing the master vehicle VM to communicate with a maximum of slave vehicles.

The master vehicle VM will then be the one that has a state of battery charge greater than the states of battery charge of the slave vehicles V1, V2, V3, V4 and the one that has a maximum transmission range making it possible to communicate with the maximum number of slave vehicles V1, V2, V3, V4 in this case. These criteria are in no way exhaustive or limiting, and other criteria may of course be taken into account, such as detection of the absence of one or more walls around the master vehicle VM for example.

Means M3 for receiving specific identifiers ID thus make it possible to list each slave vehicle V1, V2, V3, V4 by its identifier, each identifier then being recorded in the memory of the activating device DM of the master vehicle VM.

The means M4 for sending an instruction C to put their polling phase on standby to the slave vehicles V1, V2, V3, V4 are capable of sending a message to all the slave vehicles, said message containing an instruction, which is understandable by each slave vehicle, asking it to switch off or suspend its polling phase momentarily.

The means M5 for increasing the power P or frequency F of the transmissions of the polling phase thus allow the range of the transmissions in the polling phase of the master vehicle VM to be increased.

The means M6 for detecting the presence of a user U and for authenticating said user by way of an identifier ID make it possible to detect, in the enlarged transmission zone Z2 of the master vehicle VM, any user U bearing a portable equipment SD previously paired by virtue of its identifier ID with one of the slave vehicles.

The presence-detecting means M6 are capable of receiving the identifier ID and of comparing it with the specific slave-vehicle identifiers previously stored in the activating device DM of the master vehicle VM.

The means M7 for sending a polling-phase wake-up instruction R are capable of sending a wake-up message to the slave vehicle, the identifier ID of which corresponds to the identifier ID received beforehand, from the portable equipment SD of the user U, by the vehicle master VM.

The communication means M1, the selecting means M2, the receiving means M3, the means M4 for sending a standby instruction C, the means M5 for increasing the frequency F or power P of the transmissions of the master vehicle VM in the polling phase, the means M6 for detecting the presence of a user U and for authenticating said user by way of an identifier ID, and the means M7 for sending a polling-phase wake-up instruction R to the slave vehicle corresponding to the identifier ID received by the master vehicle VM preferably take the form of software included in the microcontroller (not shown) located in the electronic control unit E1, E2, E3, E4, EM of the activating device D1, D2, D3, D4, DM.

Figure 2:
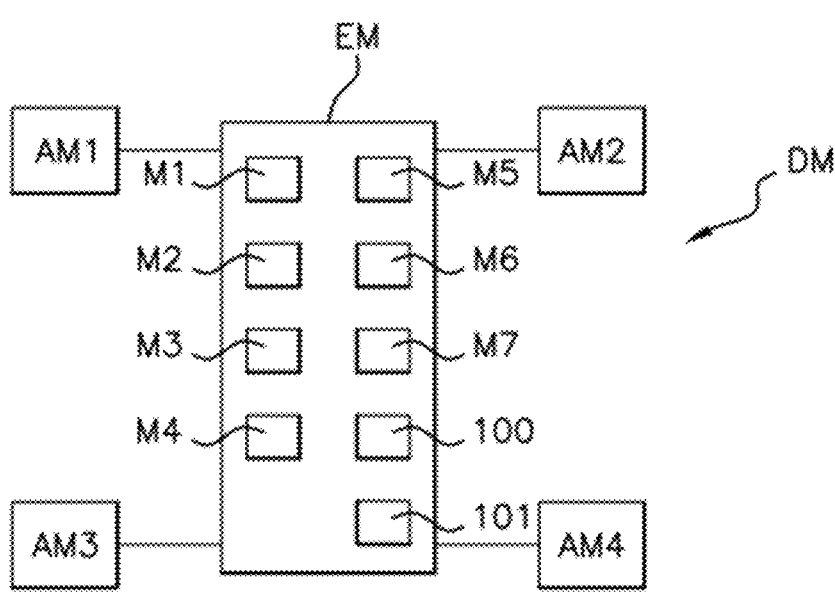

Each central control unit E1, E2, E3, E4, EM also comprises a processor 100 and a memory 101 (cf. FIG. 2) in which instructions are stored that allow the processor to be configured to execute certain particular processing operations, and in particular to implement the steps of the activating method, according to the embodiment described below.

Figure 3:
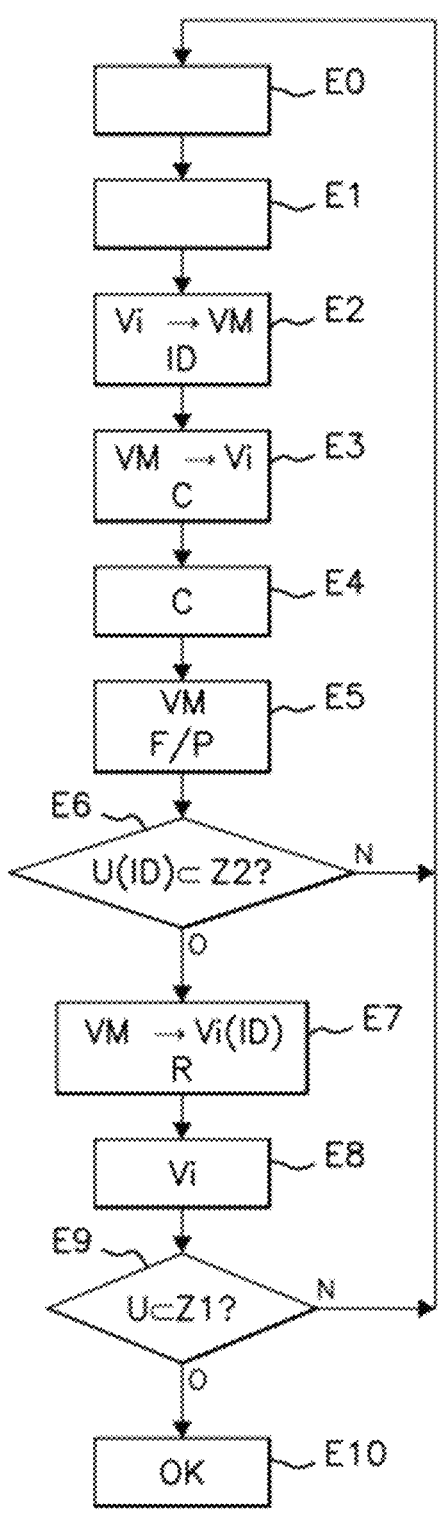
FIG. 3 is a flowchart illustrating the various steps of the activating method according to an aspect of the invention.

The method for activating a vehicle function, which is illustrated in FIG. 3, will now be described.

In a prior step E0, a communication is set up between the various vehicles V1, V2, V3, V4, VM of the plurality of vehicles, during which communication the vehicles send to one another values of predefined criteria, in the present example the state of charge of their battery, and the range of their radio-frequency transmission.

In a first step, E1, from the plurality of vehicles, a master vehicle VM is selected depending on the predefined criteria. More precisely, the master vehicle VM is the vehicle, the state of battery charge of which is greater than a predetermined threshold, or even the vehicle, the state of battery charge of which is of maximum value with respect to the states of battery charge of the other vehicles V1, V2, V3, V4. The master vehicle VM is thus the vehicle that is able to communicate with the maximum number of slave vehicles around it and either the transmission range of which is maximum or the master vehicle VM is located centrally with respect to the slave vehicles V1, V2, V3, V4 as illustrated in FIG. 1, in which the master vehicle VM is surrounded by slave vehicles V1, V2, V3, V4.

In a second step E2, each slave vehicle V1, V2, V3, V4 sends its specific identifier to the master vehicle VM and said identifier ID is recorded in the memory of the activating device DM of the master vehicle VM. It will be noted that this step may be comprised in the first step E1.

Once the master vehicle VM has been selected and the identifiers ID of each slave vehicle V1, V2, V3, V4 have been recorded in the memory of the activating device DM of the master vehicle VM, the master vehicle VM sends to each of the slave vehicles V1, V2, V3, V4 an instruction C to put their polling phase on standby in the third step E3.

On receipt of this instruction C, each slave vehicle, in the following step 4, E4, puts its polling phase on standby, and more precisely no longer transmits radio-frequency waves intended for a compatible portable equipment SD, in order to reduce consumption of its battery, the vehicle being stationary, with the engine stopped.

In the $5^{th}$ step, step E5, once the slave vehicles V1, V2, V3, V4 have been "put to sleep", the master vehicle VM for its part increases the power P and/or frequency F of the transmissions of its polling phase in order to achieve a greater transmission range, defining an enlarged predetermined zone Z2 around said master vehicle VM that encompasses not only the slave vehicles V1, V2, V3, V4 (cf. FIG. 1) but also their respective predetermined zone. This is illustrated in FIG. 1, in which the predetermined zone of slave vehicle V4 is located in the enlarged predetermined zone Z2 of the master vehicle VM. The same goes for the predetermined zones (not shown in FIG. 1) of the other slave vehicles V1, V2, V3: these other predetermined zones are located in the enlarged predetermined zone Z2. Consequently, the enlarged predetermined zone Z2 contains the predetermined zone Z1.

In the sixth step E6, if a user U bearing a portable equipment SD is located in the enlarged predetermined zone Z2, the master vehicle VM then requests the identifier ID of said equipment SD and compares it with the previously recorded identifiers ID that it received from the slave vehicles V1, V2, V3, V4 in the second step E2.

In the seventh step E7, if the identifier ID corresponds to one of the stored identifiers, then the master vehicle VM sends, to the slave vehicle corresponding to the identifier ID, an instruction R to wake up the polling phase of said slave vehicle.

In the eighth step E8, the slave vehicle V1, V2, V3, V4 proceeds to wake up its polling phase and therefore transmits radio-frequency waves in order to detect in turn the portable equipment SD borne by the user U.

In the ninth step E9, if the portable equipment SD with the identifier ID recognized beforehand is also detected by the slave vehicle in a predetermined zone Z1 around said slave vehicle permitting activation of a vehicle function, then the slave vehicle activates said function (step E10). In other words, the slave vehicle is unlocked.

It will be noted that the method is repeated each time a new vehicle V either leaves the enlarged transmission zone Z2 of the master vehicle VM or enters the enlarged transmission zone Z2. Indeed, the new vehicle V may in turn become the master vehicle VM.

The activating method and the associated activating device according to an aspect of the invention therefore allow the drawbacks of the prior art to be overcome. The method according to an aspect of the invention is particularly ingenious because it makes it possible to save the battery of the slave vehicles while continuing to poll for a portable equipment compatible with at least one of the slave vehicles by selecting a master vehicle, the transmission range of which is increased and that will ensure said detection.

This master vehicle is selected so as to be able to tolerate a more energy-intensive polling phase and also to be able to communicate with the maximum number of slave vehicles, in order to reduce the battery consumption of a maximum number of vehicles.

The invention is inexpensive and easy to implement because it requires only software modifications.

The invention claimed is:

1. A method for activating a vehicle function, of one vehicle among a plurality of vehicles, by way of a respective activating device installed in the vehicle, the respective device comprising radio-frequency communication means capable of communicating with a portable access equipment borne by a user, the vehicle function being triggered on detection of the presence of said portable user equipment in a predetermined zone around the vehicle, in a polling phase, and on authentication of said equipment, wherein the plurality of vehicles are equipped beforehand with respective radio-frequency vehicle-to-vehicle communication means, the activating method comprising:
   a) selecting a master vehicle from the plurality of vehicles, depending on predefined criteria exchanged between the respective activating devices, and slave vehicles,
   b) sending, by each slave vehicle, a specific identifier to the master vehicle,
   c) sending, by the master vehicle to each slave vehicle, an instruction to put the polling phase of the respective slave vehicle on standby,
   d) putting the polling phase of the respective slave vehicles on standby,
   e) increasing a frequency and/or power of polling transmissions of the master vehicle and generating an enlarged predetermined zone around the master vehicle,
   f) if the presence of a user authenticated by an identifier is detected in said enlarged predetermined zone around the master vehicle, then
   i) sending a wake-up instruction from the master vehicle to the slave vehicle corresponding to the identifier,
   ii) waking up said slave vehicle and getting said slave vehicle to trigger its polling phase,
   iii) activating the vehicle function of the slave vehicle if the authenticated user is located in a predetermined zone around the slave vehicle.

2. The method as claimed in claim 1, wherein the method is repeated for each new vehicle entering the enlarged transmission zone of the master vehicle or leaving said transmission zone.

3. The method as claimed in claim 1, wherein a master vehicle is selected through:
   a) vehicle-to-vehicle communication between the respective activating devices,
   b) exchange between the vehicles of values of predefined criteria,
   c) comparison, by the respective activating devices, of the values of the predefined criteria with one another.

4. The method as claimed in claim 1, wherein the predefined criteria comprise at least one of:
   a) a threshold value or a maximum value of the state of charge of a battery of the vehicle,
   b) a maximum transmission range.

5. A device for activating a vehicle function, said device being intended to be embedded in a vehicle, the device comprising radio-frequency communication means capable of communicating with a portable access equipment borne by a user, the vehicle function being triggered on detection of the presence of said portable user equipment in a predetermined zone around the vehicle, in a polling phase, and on authentication of said equipment, the device being capable of:

a) communicating with other vehicles among a plurality of vehicles, b) selecting, from the plurality of vehicles, a master vehicle and slave vehicles depending on predefined criteria, the device of the master vehicle being a master device, c) receiving, by the master device, from each slave vehicle a specific identifier, d) sending, by the master device, to each slave vehicle an instruction to put its polling phase on standby, e) increasing, by the master device, a frequency or transmit power of the polling phase, f) detecting, by the master device, the presence of a user authenticated by an identifier in an enlarged predetermined zone, g) sending, by the master device, an instruction to wake up its polling phase to a slave vehicle corresponding to the identifier of the authenticated user.

6. The device as claimed in claim 5, wherein the device is capable of exchanging, with the other vehicles, values of predefined criteria, and of comparing the values with one another.

7. The device as claimed in claim 5, wherein the predefined criteria comprise:

a) a threshold value or a maximum value of the state of charge of a battery of the vehicle, b) a maximum transmission range of the vehicle.

8. A non-transitory computer readable medium comprising program code instructions for executing the method as claimed in claim 1, when said program is executed on a respective computer of the plurality of vehicles.

9. A motor vehicle comprising a device as claimed in claim 5.

10. The device as claimed in claim 6, wherein the predefined criteria comprise:

a) a threshold value or a maximum value of the state of charge of a battery of the vehicle, b) a maximum transmission range of the vehicle.

* * * * *